Nov. 22, 1966 C. J. MROZ ETAL 3,287,604

HEAT DISSIPATING CLAMP FOR USE
ON ELECTRICAL APPARATUS
Filed April 20, 1964

INVENTORS
CHESTER J. MROZ
HERMAN H. KOLLER
BY Wade Koontz
Louis E. Hay
ATTORNEYS United States Patent Office 3,287,604

Patented Nov. 22, 1966

3,287,604

HEAT DISSIPATING CLAMP FOR USE ON ELECTRICAL APPARATUS

Chester J. Mroz, Berwyn, Pa., and Herman H. Koller, Amsterdam, N.Y., assignors to the United States of America as represented by the Secretary of the Air Force Filed Apr. 20, 1964, Ser. No. 361,632
1 Claim. (Cl. 317—100)

This invention relates to holding devices, and more specifically, to holding devices for use on electrical apparatus. This invention further relates to such holding devices, which, in addition to their usual holding function, also provide a heat sink, or a means for the transfer of heat from one element to another.

While not limited to such use, this invention has a primary application on electrical apparatus used in the severe environment encountered by missiles and satellites. This severe environment subjects such apparatus to unusual shock, vibration and acceleration. Clamps made in accordance with this invention have application with electrical elements mounted within and without the housing structure of the electrical apparatus. Because of the simplicity of the design, and because of the ease and speed with which it may be removed from the apparatus, the clamp is particularly useful for retaining externally mounted electrical elements which must be periodically exchanged or removed for testing.

One object of the present invention is to provide a removable clamp for resiliently supporting a heat generating electrical element onto the chassis of an electrical apparatus.

Another object of the present invention is to provide a clamp which will act as a heat sink for the dissipating of heat generated by the electrical element being held in place.

A further object of the present invention is to provide a clamp which may act as an efficient heat transfer means between a heat generating electrical element and the chassis on which it is mounted.

Yet another object of the present invention is to provide a clamp which will firmly hold in place an electrical element, without danger of deformation or destruction of the electrical element.

Still another object of the present invention is to provide a clamp having low manufacturing costs and without small, fragile components.

Figure 1:
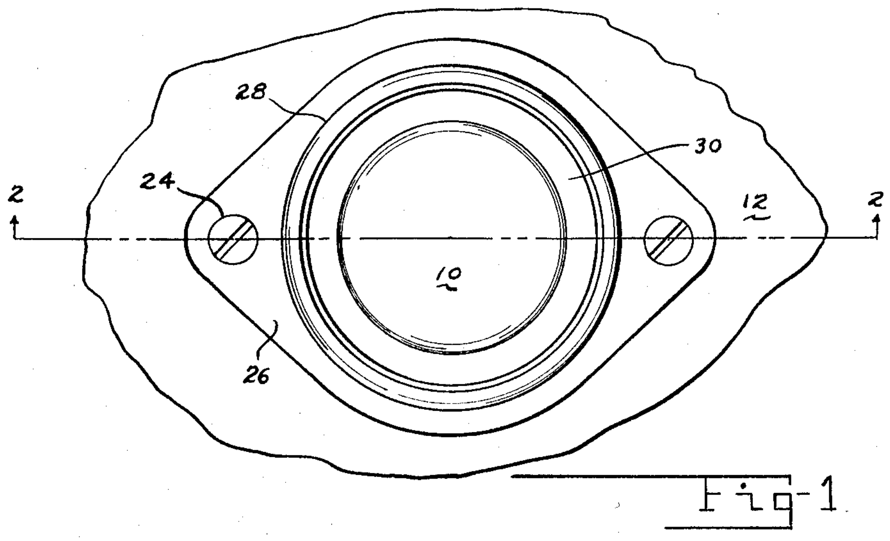
Figure 2:
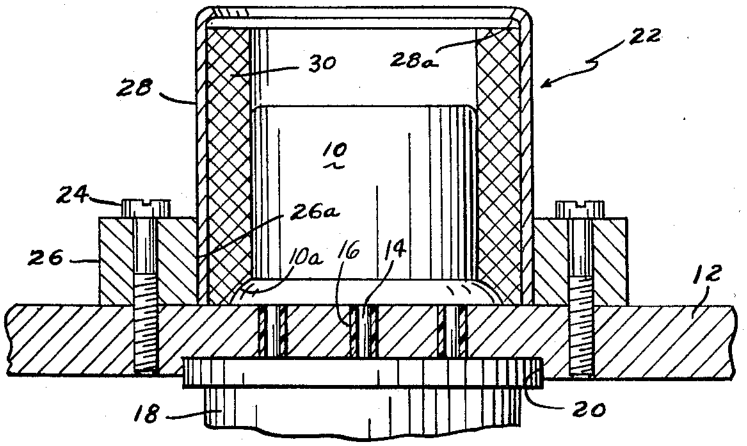

Additional objects, advantages and features of the invention reside in the construction, arrangement and combination of parts involved in the embodiment of the invention as will appear from the following description and accompanying drawing, wherein:

FIG. 1 is a plan view of the clamp holding a typical transistor to the chassis board of an electrical apparatus shown in fragment, and FIG. 2 is a vertical cross section on line 2—2 of FIG. 1 and showing construction details of the clamp.

Referring to the drawing, a typical transistor 10, having an outwardly extending flange 10*a*, is shown removably mounted on the outside of a chassis board 12 of an electrical apparatus. Joined to the transistor are insulated lead wires 14, which are shown passing through insulating sleeves 16 and into a typical socket 18, which is located and retained within a counterbase 20 on the underneath or inside face of the chassis board.

The heat dissipating clamp constituting this invention, which will be hereinafter referred to as clamp 22, is adapted for joining to the chassis board 12 by means of screws 24. The clamp comprises a metallic flange member 26, a metallic sleeve member 28 joined to the flange member, and a resilient metallic liner 30 retained within the sleeve member for engaging the flange of the electrical element to be retained, and for transferring heat from the electrical element into the sleeve member and the flange member of the clamp.

The flange member 26 may be of any convenient shape, such as circular, square, or the oval shape shown on FIG. 1, and is of a thickness substantially greater than the metal thickness of sleeve member 28 to thus provide a sink for absorbing heat. As illustrated on FIG. 2, the thickness of flange member 26 is about ten times as great as the metal thickness of sleeve member 28. Other ratios may be used, however the preferable range is between 8 to 1 and 20 to 1. The sleeve member 28 may likewise be of any convenient shape, giving consideration to the shape and size of the electrical element to be engaged. The sleeve member 28 may be joined to the flange member 26 in any convenient manner. As illustrated, the sleeve member is of cylindrical tubular form and has a first and coaxially engaging bore 26*a* of the flange member; where it may be spot welded or otherwise joined in place. The opposite or second end of the sleeve member is provided with means for retaining the resilient liner 30, by preventing axial movement from the sleeve when the clamp is brought into position and the resilient liner biases the transistor against the chassis board. As illustrated, one method of providing the retaining means is to inwardly roll the sleeve to provide a retaining flange 28*a* as the terminus of the second end of the sleeve.

The resilient liner 30 may be made from any structurally stable material having good heat transfer characteristics. Woven metallic mesh, of which copper mesh is an ideal example and readily available on the open market, has been found to be an excellent material. Such material is not only non abradable under deformation, but also has excellent heat transfer characteristics.

The clamp as described and shown on the drawing, will not only absorb heat from the transistor, but will also transfer heat to the chassis board which will then of itself act as a heat sink.

It is to be understood that the embodiment of the present invention as shown and described is to be regarded as illustrative only and that the invention is susceptible to variations, modifications and changes within the scope of the appended claim.

We claim:

In a clamp for retaining an outwardly flanged heat generating electrical element onto an electrical apparatus, the combination with said electrical element and said apparatus of and comprising: a heat conductive metallic flange member having a bore surrounding said electrical element and for joining the electrical apparatus, a heat conductive metallic sleeve member coaxial within the bore of said flange member and having a first end joined to said flange member and having a second end extending from said flange member with an inwardly rolled flange forming the terminus of the second end, said heat conductive metallic flange member being of a thickness substantially greater than the metal thickness of said heat conductive metallic sleeve member to provide a sink for absorbing heat, and a heat conductive resilient liner circumferentially surrounding the portion of the electrical element above the outward flange thereon and being coaxially retained within said sleeve member and abutting against the inwardly rolled flange at the second end of said sleeve member longitudinally engaging with the lower end of said heat conductive liner the flange on the electrical element to resiliently bias the electrical element toward the electrical apparatus and to conduct heat from the electrical element to said sleeve member and said flange member, said heat conductive resilient liner being a metallic mesh.

(References on following page)

References Cited by the Examiner

UNITED STATES PATENTS

| | | | |
|---|---|---|---|
| 2,715,518 | 8/1955 | Bickler. | |
| 2,973,400 | 2/1961 | McAdam | 174—35 |
| 3,005,036 | 10/1961 | Mowatt | 174—35 |
| 3,193,610 | 7/1965 | Worden | 174—35 |

FOREIGN PATENTS

| | | |
|---|---|---|
| 219,502 | 5/1957 | Australia. |
| 352,733 | 7/1931 | Great Britain. |

ROBERT K. SCHAEFER, *Primary Examiner.*

W. C. GARVERT, *Assistant Examiner.*